US009293992B2

(12) United States Patent
Chern et al.

(10) Patent No.: US 9,293,992 B2
(45) Date of Patent: *Mar. 22, 2016

(54) VOLTAGE REGULATOR

(71) Applicant: TAIWAN SEMICONDUCTOR MANUFACTURING COMPANY, LTD., Hsinchu (TW)

(72) Inventors: Chan-Hong Chern, Palo Alto, CA (US); Tzu Ching Chang, Dali (TW); Min-Shueh Yuan, Taipei (TW); Yuwen Swei, Fremont, CA (US); Chih-Chang Lin, San Jose, CA (US); Chiang Pu, San Jose, CA (US); Ming-Chieh Huang, San Jose, CA (US); Kuoyuan Hsu, San Jose, CA (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,426

(22) Filed: May 30, 2014

(65) Prior Publication Data

US 2014/0266114 A1 Sep. 18, 2014

Related U.S. Application Data

(63) Continuation of application No. 13/744,037, filed on Jan. 17, 2013, now Pat. No. 8,766,613, which is a continuation of application No. 12/750,260, filed on Mar. 30, 2010, now Pat. No. 8,378,654.

(60) Provisional application No. 61/168,813, filed on Apr. 13, 2009, provisional application No. 61/165,751, filed on Apr. 1, 2009.

(51) Int. Cl.
*G05F 1/44* (2006.01)
*H02M 3/158* (2006.01)
*G05F 1/56* (2006.01)

(52) U.S. Cl.
CPC .............. *H02M 3/158* (2013.01); *G05F 1/44* (2013.01); *G05F 1/56* (2013.01)

(58) Field of Classification Search
CPC .............. H02M 3/156–3/158; H02M 3/1588; G05F 1/56; G05F 1/575
USPC .......... 323/224, 225, 270, 271, 280–284, 351
See application file for complete search history.

(56) References Cited

U.S. PATENT DOCUMENTS 5,864,227 A  1/1999 Borden et al.
6,201,375 B1  3/2001 Larson et al.

(Continued)

*Primary Examiner* — Adolf Berhane
(74) *Attorney, Agent, or Firm* — Hauptman Ham, LLP

(57) ABSTRACT

A voltage regulator circuit comprises an amplifier having an inverting input and a non-inverting input. The amplifier is configured to generate a control signal based on a reference signal at the inverting input of the amplifier and a feedback signal at the non-inverting input of the amplifier. The voltage regulator circuit also comprises an output node, a first power node, a second power node, and a driver that generates a driving current flowing toward the output node in response to the control signal. The driver is coupled between the first power node and the output node. A first transistor having a gate is coupled between the output node and the second power node. A bias circuit outside the amplifier supplies a bias signal to the gate of the first transistor, which is configured to operate in a saturation mode based on the bias signal supplied by the bias circuit.

20 Claims, 7 Drawing Sheets

(56) References Cited

U.S. PATENT DOCUMENTS

| | | |
|---|---|---|
| 7,071,664 B1 | 7/2006 | Teggatz et al. |
| 7,199,567 B2 | 4/2007 | Eberlein |
| 7,477,043 B2 | 1/2009 | Eberlein |
| 7,477,044 B2 | 1/2009 | Eberlein |
| 7,538,526 B2 | 5/2009 | Kojima et al. |
| 7,973,518 B2 | 7/2011 | Shor et al. |
| 7,973,521 B2 | 7/2011 | Chen et al. |
| 8,080,984 B1 | 12/2011 | Geynet |
| 8,115,463 B2 | 2/2012 | Wang |
| 8,120,338 B2 | 2/2012 | Kawagishi et al. |
| 8,154,263 B1 | 4/2012 | Shi et al. |
| 8,169,204 B2 | 5/2012 | Jian |
| 8,183,843 B2 | 5/2012 | Einerman et al. |
| 8,188,725 B2 | 5/2012 | Draghi et al. |
| 8,378,654 B2 * | 2/2013 | Chern et al. .............. 323/282 |
| 8,427,069 B2 * | 4/2013 | Wibben .............. 315/291 |
| 8,541,993 B2 * | 9/2013 | Notman et al. .............. 323/271 |
| 8,766,613 B2 * | 7/2014 | Chern et al. .............. 323/282 |

* cited by examiner

VOLTAGE REGULATOR

PRIORITY CLAIM

The present application is a continuation of U.S. application Ser. No. 13/744,037, filed Jan. 17, 2013, which is a continuation of U.S. application Ser. No. 12/750,260, filed Mar. 30, 2010, now U.S. Pat. No. 8,378,654, which claims the priority of U.S. Provisional Application Nos. 61/165,751, filed Apr. 1, 2009 and 61/168,813, filed Apr. 13, 2009, which are incorporated herein by reference in their entireties.

BACKGROUND

A voltage regulator is an electrical regulator designed to automatically maintain a constant voltage level. A voltage regulator takes an environmentally sensitive voltage input and generates a stable output voltage. Therefore, constructing a voltage regular with an accurately regulated output voltage over various environments (e.g. process, voltage, and temperature, "PVT") is an important design goal. Precise control of load regulation ($\Delta V_{OUT}/\Delta I$) across various environments is desirable. For example, in embedded Dynamic Random Access Memory (eDRAM) devices, accurate bit-line reference voltage is required for precise operations. In general, a voltage regulator should be able to isolate impacts of both source (supply) and sink charge from the regulated output and overcome over-voltage (or "hiccup") problem. Further, a voltage regulator should be able to overcome instability at low output currents.

Another important characteristic of a voltage regulator is a high power supply rejection ratio (PSRR), which is used to describe the amount of noise from a power supply that can be rejected. The value of PSRR depends on the power supply being considered, thus the PSRR for the higher supply voltage is different than the PSRR of the lower supply voltage. The PSRR is defined as the ratio of the change in power supply voltage ($\Delta V_{DD}$) to the change in output voltage ($\Delta V_{OUT}$) caused by the change in the power supply, $$PSRR=\Delta V_{DD}/\Delta V_{OUT}.$$

An ideal voltage regulator would have infinite PSRR. A real voltage regulator would have a finite PSRR, but a higher PSRR across all frequency (especially around chip resonance frequency of about a few MHz to 100 MHz) is desirable. Higher PSRR is crucial in many modern System on Chip (SOC) or System in Package (SiP) designs where power supply noise immunity is very important.

There are prior arts for producing voltage regulators, but some encounter over voltage (or "hiccup") problem and/or low-load current instability problem. Some have improved on those problems but have not accurately regulated output voltage and/or have poor PSRR.

FIG. 1A illustrates an example of a conventional voltage regulator circuit. The circuit 100 suffers from over-voltage (or hiccup) problem. When load current rapidly changes from a large value to a very small value, the feedback loop 102 locked up because the feedback control loop 102 cannot remove the excess charge from the output capacitor 101 fast enough. Also, when the output current level is below a minimum required output current value, there is instability at the output voltage because the feedback loop 102 cannot function as designed due to insufficient gain of the loop. (The loop gain is proportional to the transconductance $g_m$ and output resistance $R_{out}$, and $g_m$ is proportional to the drain current through the PMOS 104.) Also, the circuit has a poor PSRR at mid to high power supply noise frequency, typically around a few MHz to 100 MHz, because the feedback loop 102 cannot respond fast enough for output ($V_{REG}$) change resulting from power supply noise. The circuit response is slow due to the limited bandwidth and cannot respond to high frequency noise. Further, there is no trimming capability for high accuracy $V_{REG}$ output in the circuit 100 shown in FIG. 1A.

FIG. 1B illustrates the output current-voltage plot of an example conventional voltage regulator circuit as shown in FIG. 1A. As the current changes from zero to a small value (minus value means the current flows out), the output voltage changes rapidly until the output voltage reaches saturation (slower change), mainly due to the operation point of the PMOS transistor 104. Therefore, the prior art circuit suffers from a steep output voltage variation as shown in FIG. 1B. For example, an output voltage variation of about 30 mV was estimated from a conventional circuit similar to the circuit 100 shown in FIG. 1A. Further, a poor phase margin (less than 50 degrees) from the conventional circuit 100 can require a large decoupling capacitance of around 200 pF.

Accordingly, new methods and circuits for a voltage regulator to improve accuracy and overcome over-voltage problem, instability at low output currents, and poor PSRR are desired.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A voltage regulator circuit to achieve high accuracy and high PSRR is provided. Throughout the various views and illustrative embodiments of the present invention, like reference numbers are used to designate like elements.

Figure 1A:
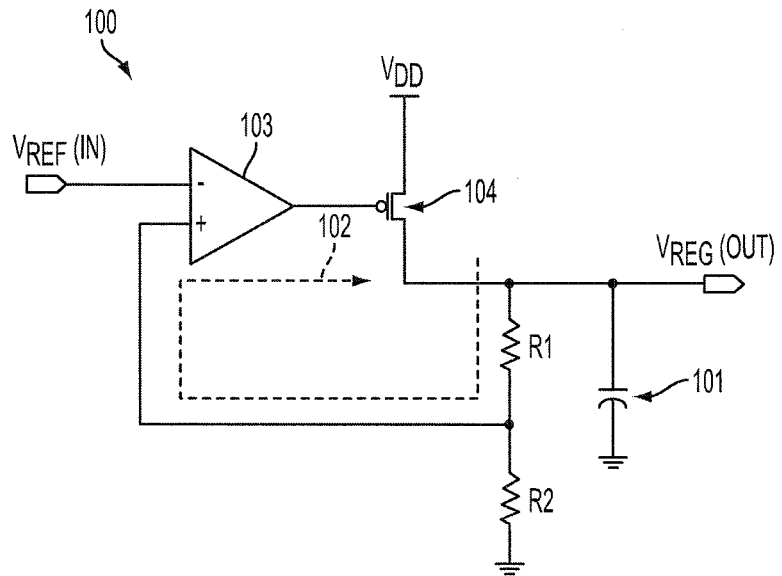
FIG. 1A illustrates an example of a conventional voltage regulator circuit.
Figure 1B:
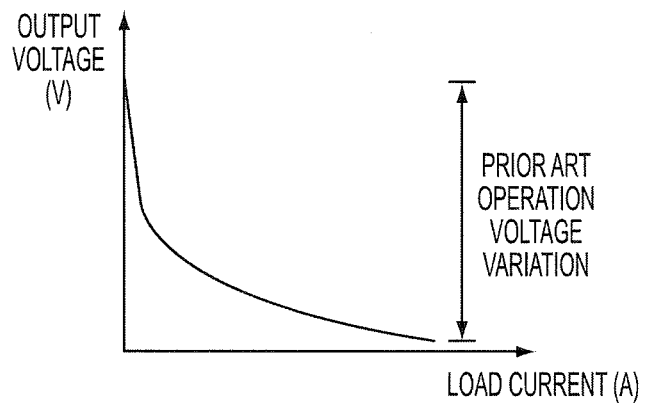
FIG. 1B illustrates the output current-voltage plot of an example conventional voltage regulator circuit as shown in FIG. 1A.
Figure 2A:
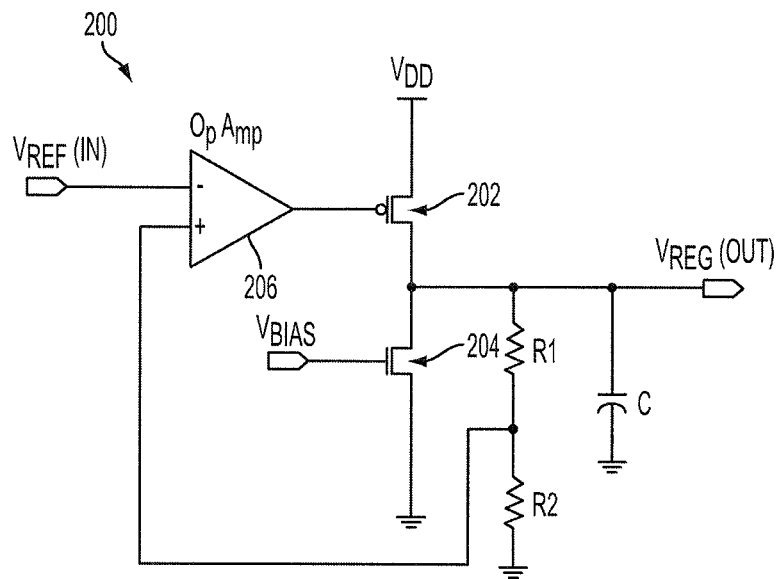
FIG. 2A illustrates an exemplary embodiment of a voltage regulator circuit according to an embodiment of the invention.

FIG. 2A illustrates an exemplary embodiment of a voltage regulator circuit according to an embodiment of the invention. The output stage PMOS transistor 202 in the circuit 200 provides sufficient current for output load. The bias voltage ($V_{bias}$) keeps the NMOS transistor 204 at saturation mode independent of environments.

Figure 2B:
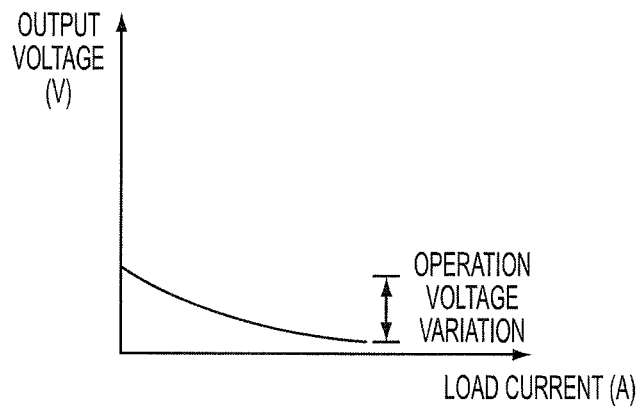
FIG. 2B illustrates the output current-voltage plot of an example voltage regulator circuit as shown in FIG. 2A, showing substantially smaller load regulation variation.

FIG. 2B illustrates the output current-voltage plot of an example voltage regulator circuit as shown in FIG. 2A, showing substantially smaller load regulation variation. Because the NMOS transistor 204 is at saturation mode, the output voltage variation from the load current change is relatively small (e.g. ~10 mA). The NMOS transistor 204 in saturation mode provides current (e.g. ~60 μA) to keep the required input voltage swing to the Op-Amp 206 small, which is related to the small output voltage swing resulting from load current change as shown in FIG. 2B. Also, because of the small output voltage swing required for load current change, it is easier to provide current when many voltage regulators are connected together. Further, the circuit 200 in FIG. 2A requires less decoupling capacitance needed to achieve better than 60 degrees phase margin compared to conventional design, due to smaller load regulation $\Delta V_{OUT}/\Delta I$. Because of the bias voltage in the circuit 200, it further reduces PVT variation for the regulated output voltage. The biasing voltage/current can be designed to be adjustable, therefore output voltage variation/accuracy can be adjusted depending on applications to achieve best power and performance. The circuit 200 can be used to provide an accurate output voltage for various applications, e.g. a memory bit-line reference voltage, such as $V_{DD}$ or $V_{SS}$ sensing in eDRAM.

Figure 2C:
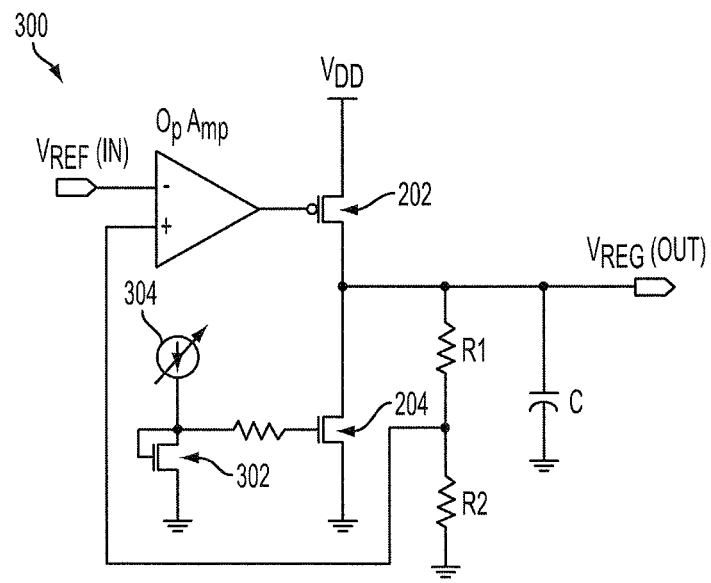
FIG. 2C illustrates one example of implementing the bias voltage to put the NMOS transistor 504 in saturation mode.

FIG. 2C illustrates one example of implementing the bias voltage to put the NMOS transistor 204 in saturation mode. The circuit 300 has another NMOS transistor 302 connected to a current source 304 (adjustable) to provide the bias voltage.

Figure 2D:
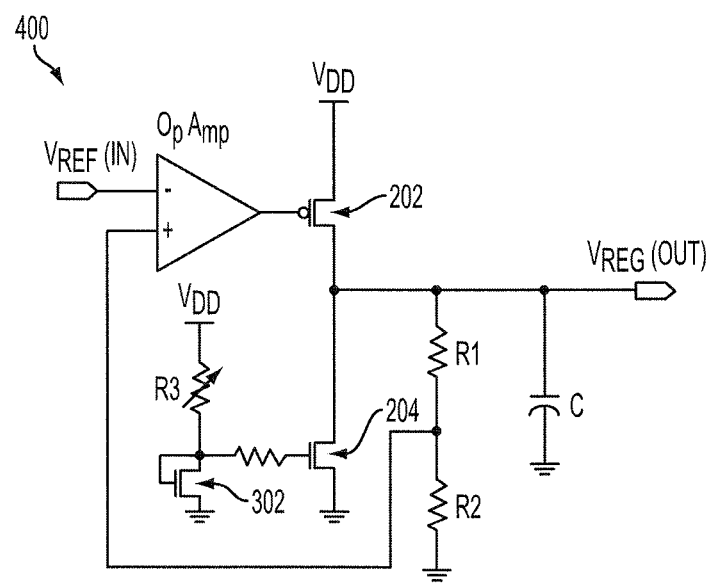
FIG. 2D illustrates another example of implementing the bias voltage to put the NMOS transistor 504 in saturation mode.

FIG. 2D illustrates another example of implementing the bias voltage to put the NMOS transistor 204 in saturation mode. The circuit 400 has another NMOS transistor 302 connected to the power supply $V_{DD}$ through a variable resistor R3 to provide the bias voltage.

Figure 2E:
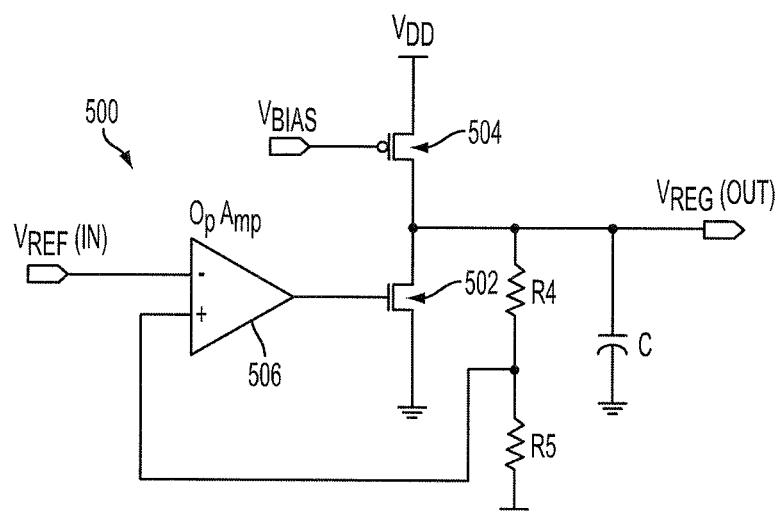
FIG. 2E illustrates an embodiment of a voltage regulator circuit according to the invention.

FIG. 2E illustrates another embodiment of a voltage regulator circuit according to the invention, similar to the circuit in FIG. 2A. The circuit 500 includes an NMOS transistor 502 connected to the op-amp 506 instead of a PMOS transistor compared to the circuit 200 in FIG. 2A. Also, the circuit 500 includes a PMOS 504 biased by $V_{bias}$ to keep it in saturation mode, instead of an NMOS 204 compared to the circuit 200 in FIG. 2A. The circuit 500 is a different embodiment of this invention, and a person skilled in the art will appreciate that there can be many different embodiment variations of the invention.

Figure 3A:
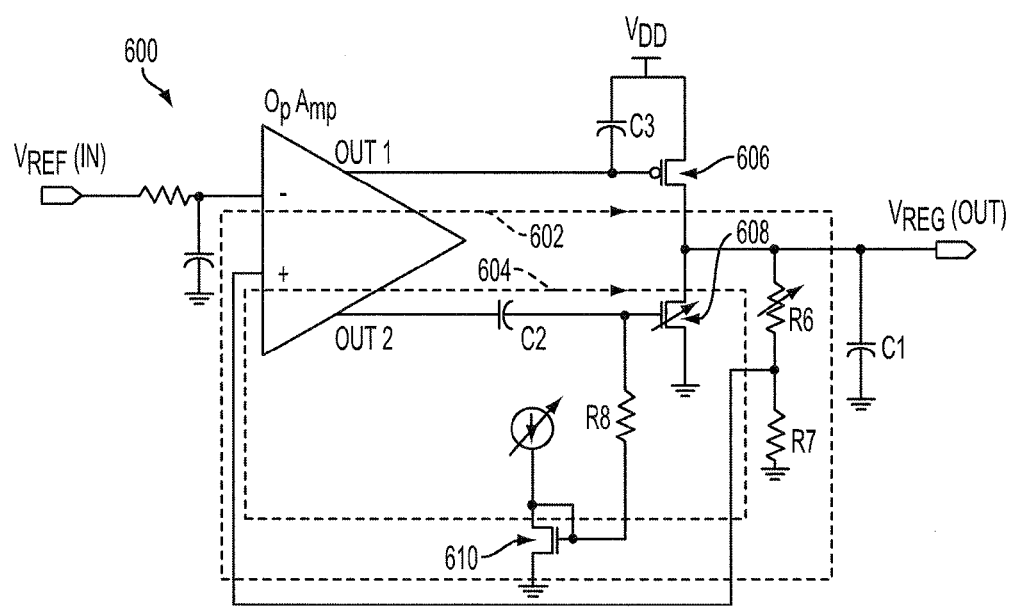
FIG. 3A and FIG. 3B illustrate exemplary embodiments of a voltage regulator circuit according to one or more embodiments of the invention.

FIG. 3A illustrates an exemplary embodiment of a voltage regulator circuit according to an embodiment of the invention. The circuit 600 further adds more components on the circuit 200 shown in FIG. 2A. The circuit 600 uses one comparator (e.g. high bandwidth Op Amp) with dual outputs, i.e. Out 1 and Out 2. The first feed back loop 602 is under the regular load condition, and the driver PMOS 606 between the power supply voltage ($V_{DD}$) and the regulator output ($V_{REG}$) provides the source current to the output load. An op-amp with a reference voltage input $V_{REF}$ through RC elements to its inverting input has the op-amp's first output (Out 1) connected to the gate of the PMOS transistor 606. The source and drain of the PMOS transistor 606 are each connected to the power supply voltage ($V_{DD}$) and to the voltage regulator output $V_{REG}$. The voltage regulator output is also connected to an NMOS transistor 608 and a series of two resistors R6 and R7. The NMOS transistor 608 is biased to operate in saturation mode and the non-inverting input of the op-amp is connected in between the two resistors R6 and R7 for the first feedback loop 602, where R6 is variable.

Further, the op-amp's second output (Out 2) is connected to the gate of the NMOS transistor 608 through an AC-coupling capacitor C2 for the second feedback loop 604. The op-amp's first output (Out 1) is connected to the power supply voltage ($V_{DD}$) through a capacitor C3 to further improve high frequency PSRR. The voltage regulator input $V_{REF}$ is connected to RC elements to filter out input noise and the voltage regulator output is connected to a de-coupling capacitance C1 to filter out output noise. The current capacity of the NMOS transistor 608 is adjustable and the bias voltage to the NMOS transistor 608 can be supplied using a second NMOS transistor 610 connected to a current source, where the gate and drain of the second NMOS transistor 610 are connected together and the current source is also adjustable.

The second feed back loop 604 quickly responds and corrects output over-voltage conditions. For example, any abrupt output voltage change is fed back and AC coupled by the capacitor C2 to activate the pull-down circuit that includes the NMOS transistor 608 to quickly discharge excess charge at the output. The NMOS transistor 608 has variable current capacity (trim-able). Therefore, high frequency PSRR of this voltage regulator circuit 600 is greatly improved by including the second loop 604 with AC coupling capacitance C2. The DC bias (through R8) and trim-able pull-down transistor 608 provides a reasonable pass current to prevent a low-load instability issue.

Therefore, the novel regulator not only has high PSRR but also resolves over-voltage and low-load instability issues dynamically, which minimizes power waste during regular load operation. In some embodiments, the regulator has a small gate-source voltage (Vgs) for NMOS transistor 608 to prevent instability issue at low-load or no-load situation and sink excess charge due to low frequency over-voltage. In high frequency over-voltage situation, high voltage from Out 2 is AC coupled to the Vgs of NMOS transistor 608 to quickly sink large amount of excess charge. With different gate-source biases to NMOS 608 at DC/low-frequency and high-frequency, it minimizes DC power waste under regular load situations as result in improving the voltage regulator's current supply efficiency.

A tracking capacitor (C3) between the power supply $V_{DD}$ and driver 606 (pass-element between regulator in and regulator out) is utilized to further improve high frequency PSRR. Trim-able $V_{REG}$ output voltage (through e.g. R6) can be used to achieve higher accuracy voltage output voltage. Also, the comparator's reference input noise is filtered (e.g. RC elements coupled to the $V_{REF}$ input).

The advantageous features of the circuit 600 include using only a single comparator amplifier (the Op Amp) design to achieve high PSRR as well as resolving critical over-voltage and low-load instability issues of voltage regulators. The AC coupling path quickly discharges over-voltage at the regulator output due to sudden change of the load, and adjustable pull-down network, providing enough current to have adequate $g_m$ of the PMOS driver 606 to maintain large enough loop gain in order to address low-load instability issue. Tracking capacitance between the power supply and driver 606 (pass-element between regulator in and regulator out) further improves high-frequency PSRR. The $V_{REG}$ output and minimum-load current can be adjusted for high accuracy and stability. Other advantages include that this regulator do not require feed-back loop 602 to be out of control before it can function for preventing the over-voltage issue. Further, the regulator has trimming capability for high accuracy $V_{REG}$ output and minimum-load current for stability.

Figure 3B:
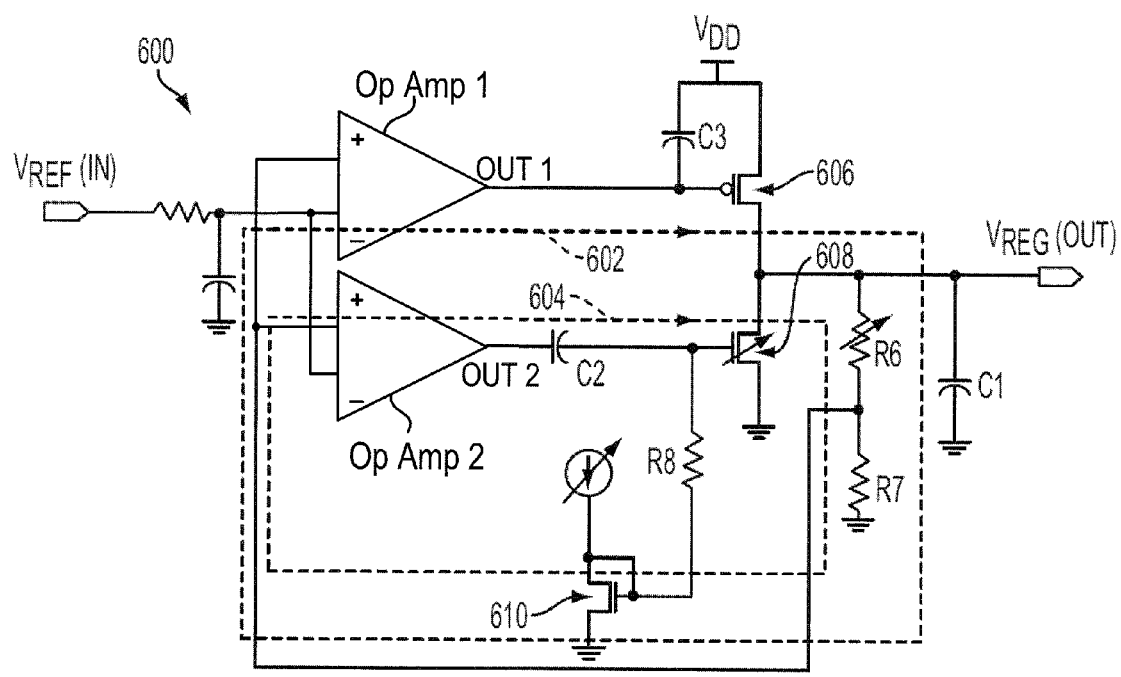

FIG. 3B illustrates another example embodiment of a voltage regulator circuit according to an embodiment of the invention. Compared with the circuit 600 depicted in FIG. 3A, the amplifier Op Amp with dual outputs is replaced by two amplifiers (Op Amp 1 and Op Amp 2) each have a single output OUT 1 and OUT 2.

Figure 3C:
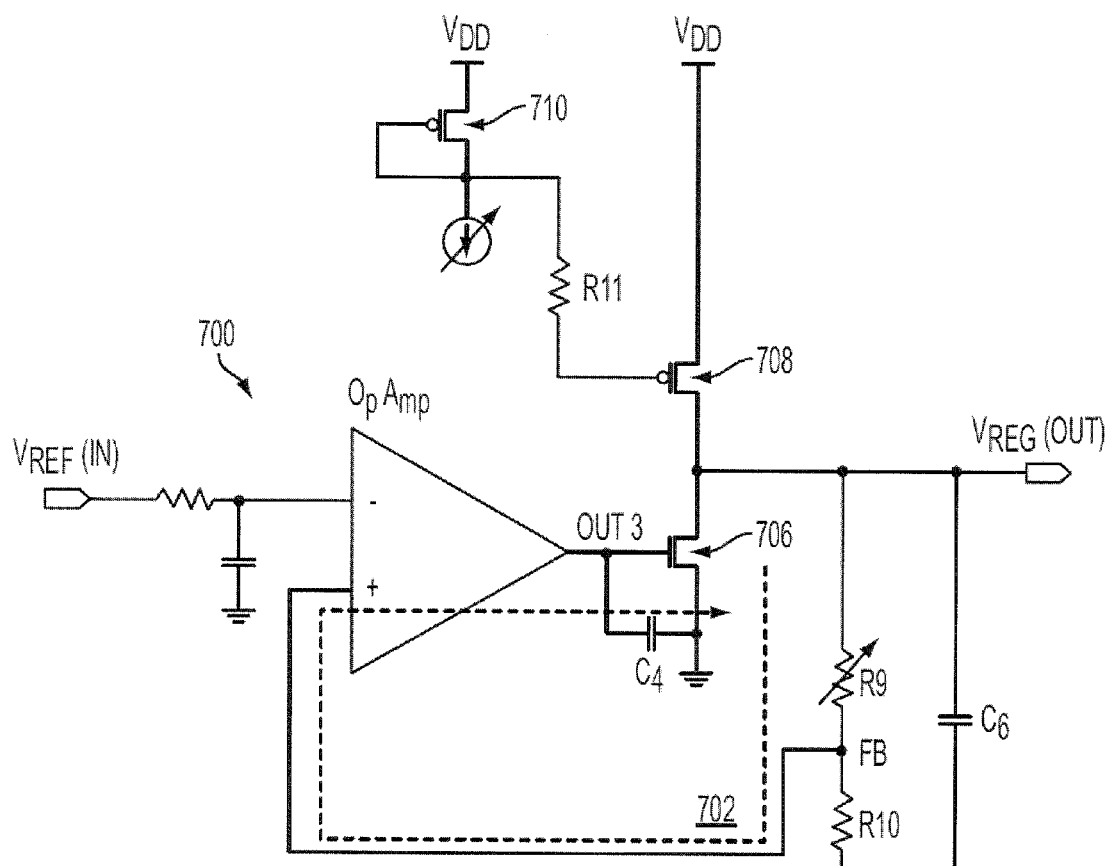
FIG. 3C illustrates an embodiment of a voltage regulator circuit according to the invention.

FIG. 3C illustrates another embodiment of a voltage regulator circuit according to the invention. The op-amp with a voltage input to its inverting input through RC elements has the op-amp's output connected to the gate of an NMOS transistor 706. The source and drain of the NMOS transistor 706 are each connected to the ground and to the voltage regulator output. The voltage regulator output is also connected to a PMOS transistor 708 and a series of two resistors R9 and R10. The PMOS transistor 708 is biased to operate in saturation mode and the non-inverting input of the op-amp is connected in between the two resistors R9 and R10 for a first feedback loop 702, where R9 is variable. The op-amp's output can be connected to the ground through a capacitor C4 to improve high frequency PSRR. The voltage regulator input $V_{REF}$ is connected to the op-amp's inverting input through RC elements to filter out input noise and the voltage regulator output $V_{REG}$ is connected to a de-coupling capacitance C6 to filter out output noise. The current capacity of the PMOS transistor 708 can be adjustable and the bias voltage to the PMOS transistor 708 can be supplied using a second PMOS transistor 710 connected to a variable current source, where the gate and drain of the PMOS transistor 710 are connected together. A skilled person in the art will appreciate that there can be many embodiment variations of this invention.

An aspect of this description relates to a voltage regulator circuit comprising an amplifier having an inverting input and a non-inverting input. The amplifier is configured to generate a control signal based on a reference signal at the inverting input of the amplifier and a feedback signal at the non-inverting input of the amplifier. The voltage regulator circuit also comprises an output node, a first power node, a second power node, and a driver configured to generate a driving current flowing toward the output node in response to the control signal. The driver is coupled between the first power node and the output node. The voltage regulator circuit further comprises a first transistor having a gate. The first transistor is coupled between the output node and the second power node. The voltage regulator circuit additionally comprises a bias circuit outside the amplifier configured to supply a bias signal to the gate of the first transistor. The first transistor is configured to operate in a saturation mode based on the bias signal supplied by the bias circuit.

Another aspect of this description relates to a voltage regulator circuit comprising an output node, a feedback loop, and a first transistor having a first gate. The first transistor is configured to generate a first driving current flowing toward the output node in response to at least a reference voltage and a voltage level at the output node. The first gate of the first transistor and the output node are within the feed-back loop. The voltage regulator circuit also comprises a second transistor having a second gate. The second transistor is configured to generate a second driving current flowing away from the output node. The second gate of the second transistor is outside of the feed-back loop. The voltage regulator circuit further comprises a bias circuit configured to supply a bias signal to the second gate of the second transistor. The second transistor is configured to operate in a saturation mode based on the bias signal supplied by the bias circuit.

A further aspect of this description relates to a voltage regulator circuit comprising an amplifier having an inverting input, a non-inverting input, an inverting output and a non-inverting output. The amplifier is configured to generate a first control signal based on a reference signal at the inverting input of the amplifier, output the first control signal at the non-inverting output of the amplifier, generate a second control signal based on a feedback signal at the non-inverting input of the amplifier, and output the second control signal at the non-inverting output of the amplifier. The voltage regulator circuit also comprises a first power node, a second power node, and a driver configured to generate a driving current flowing toward the output node in response to the first control signal. The driver is coupled between the first power node and the output node. The voltage regulator circuit further comprises a first transistor having a gate. The first transistor is coupled between the output node and the second power node, and the second control signal is AC coupled with the gate of the first transistor. The voltage regulator circuit additionally comprises a bias circuit outside the amplifier configured to cause the first transistor to be DC biased by supplying a bias signal to the gate of the first transistor. The first transistor is configured to operate in a saturation mode based on the bias signal supplied by the bias circuit.

Although the embodiments of the present invention have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A voltage regulator circuit comprising:
    an amplifier having an inverting input and a non-inverting input, the amplifier being configured to generate a control signal based on a reference signal at the inverting input of the amplifier and a feedback signal at the non-inverting input of the amplifier;
    an output node;
    a first power node;
    a second power node;
    a driver configured to generate a driving current flowing toward the output node in response to the control signal, the driver being coupled between the first power node and the output node;
    a first transistor having a gate, the first transistor being coupled between the output node and the second power node; and
    a bias circuit outside the amplifier configured to supply a bias signal to the gate of the first transistor, the first transistor being configured to operate in a saturation mode based on the bias signal supplied by the bias circuit.

2. The voltage regulator circuit of claim 1, wherein the bias circuit comprises a second transistor and a current source circuit connected to a gate and a drain of the second transistor, a source of the second transistor is connected to a ground, and the drain of the second transistor is connected to the gate of the first transistor through a resistor.

3. The voltage regulator circuit of claim 2, wherein the first transistor is an NMOS transistor and the second transistor is an NMOS transistor.

4. The voltage regulator circuit of claim 3, wherein the first transistor is adjustable to change a current capacity of the first transistor.

5. The voltage regulator circuit of claim 2, wherein a capacitor is connected to the output node and to the ground.

6. The voltage regulator circuit of claim 2, wherein the current source circuit includes a variable resistor connected to the second power node.

7. The voltage regulator circuit of claim 1, wherein the amplifier further comprises an amplifier output connected to the gate of the first transistor through a capacitor.

8. A voltage regulator circuit comprising:
an output node;
a feedback loop;
a first transistor having a first gate, the first transistor being configured to generate a first driving current flowing toward the output node in response to at least a reference voltage and a voltage level at the output node, the first gate of the first transistor and the output node being within the feed-back loop;
a second transistor having a second gate, the second transistor being configured to generate a second driving current flowing away from the output node, the second gate of the second transistor being outside of the feedback loop; and
a bias circuit configured to supply a bias signal to the second gate of the second transistor, the second transistor being configured to operate in a saturation mode based on the bias signal supplied by the bias circuit.

9. The voltage regulator circuit of claim 8, wherein the bias circuit comprises a third transistor and a current source circuit connected to a gate and a drain of the third transistor, a source of the third transistor is connected to a ground, and the drain of the third transistor is connected to the second gate of the second transistor through a resistor.

10. The voltage regulator circuit of claim 9, wherein the second transistor is an NMOS transistor and the third transistor is an NMOS transistor.

11. The voltage regulator circuit of claim 10, wherein the second transistor is adjustable to change a current capacity of the second transistor.

12. The voltage regulator circuit of claim 9, wherein a capacitor is connected to the output node and to the ground.

13. The voltage regulator circuit of claim 9, wherein the current source circuit includes a variable resistor connected to the second power node.

14. The voltage regulator circuit of claim 8, wherein the first transistor is connected to the second gate of the second transistor through a capacitor.

15. A voltage regulator circuit comprising:
an amplifier having an inverting input, a non-inverting input, a first output and a second output, the amplifier being configured to generate a first control signal based on a reference signal at the inverting input of the amplifier, output the first control signal at the first output of the amplifier, generate a second control signal based on a feedback signal at the non-inverting input of the amplifier, and output the second control signal at the second output of the amplifier;
a first power node;
a second power node;
a driver configured to generate a driving current flowing toward the output node in response to the first control signal, the driver being coupled between the first power node and the output node;
a first transistor having a gate, the first transistor being coupled between the output node and the second power node, and the second control signal being AC coupled with the gate of the first transistor; and
a bias circuit outside the amplifier configured to cause the first transistor to be DC biased by supplying a bias signal to the gate of the first transistor,
wherein the first transistor is configured to operate in a saturation mode based on the bias signal supplied by the bias circuit.

16. The voltage regulator circuit of claim 15, wherein the bias circuit comprises a second transistor and a current source circuit connected to a gate and a drain of the second transistor, wherein a source of the second transistor is connected to a ground and the drain of the second transistor is connected to the gate of the first transistor through a resistor.

17. The voltage regulator circuit of claim 16, wherein the first transistor is an NMOS transistor and the second transistor is an NMOS transistor.

18. The voltage regulator circuit of claim 17, wherein the first transistor is adjustable to change a current capacity of the first transistor.

19. The voltage regulator circuit of claim 16, wherein a capacitor is connected to the output node and to the ground.

20. The voltage regulator circuit of claim 16, wherein the current source circuit includes a variable resistor connected to the second power node.

* * * * *